(12) United States Patent
Sarraf et al.

(10) Patent No.: US 10,756,498 B1
(45) Date of Patent: Aug. 25, 2020

(54) TERMINAL HEAT EXCHANGER FOR AN ELECTRICAL CONNECTOR

(71) Applicants: TE CONNECTIVITY CORPORATION, Berwyn, PA (US); TE CONNECTIVITY GERMANY GmbH, Bensheim (DE)

(72) Inventors: David Bruce Sarraf, Elizabethtown, PA (US); Helge Schmidt, Speyer (DE); Nathan Philip Myer, Lancaster, PA (US); Aaron James de Chazal, Rochester, MI (US)

(73) Assignees: TE CONNECTIVITY CORPORATION, Berwyn, PA (US); TE CONNECTIVITY GERMANY GmbH, Bensheim (DE)

( * ) Notice: Subject to any disclaimer, the term of this patent is extended or adjusted under 35 U.S.C. 154(b) by 0 days.

(21) Appl. No.: 16/362,079

(22) Filed: Mar. 22, 2019

(51) Int. Cl.
| | |
|---|---|
| H01R 13/50 | (2006.01) |
| H01R 24/66 | (2011.01) |
| H01R 4/02 | (2006.01) |
| B60L 53/16 | (2019.01) |
| H02J 7/00 | (2006.01) |
| H01R 13/422 | (2006.01) |
| H01R 103/00 | (2006.01) |
| H01R 13/00 | (2006.01) |
| H01H 1/62 | (2006.01) |

(52) U.S. Cl.
CPC .............. *H01R 24/66* (2013.01); *B60L 53/16* (2019.02); *H01R 4/029* (2013.01); *H01R 13/50* (2013.01); *H02J 7/0045* (2013.01); *H01H 1/62* (2013.01); *H01R 13/005* (2013.01); *H01R 13/4223* (2013.01); *H01R 2103/00* (2013.01); *H01R 2201/26* (2013.01)

(58) Field of Classification Search
CPC ................................ H01R 13/005; H01H 1/62
See application file for complete search history.

(56) References Cited

U.S. PATENT DOCUMENTS

| | | | | |
|---|---|---|---|---|
| 6,471,530 | B1 * | 10/2002 | Gimbatti | H01R 13/005 439/196 |
| 7,292,437 | B2 * | 11/2007 | Cohen | G06F 1/20 165/80.4 |
| 7,427,210 | B2 * | 9/2008 | Martinson | H01L 23/4093 439/487 |
| 7,641,506 | B2 * | 1/2010 | Sacher | H01R 4/28 439/485 |
| 10,050,396 | B2 * | 8/2018 | Schwan | H01R 25/162 |
| 2019/0315239 | A1 * | 10/2019 | Beimdieck | B60L 53/302 |

* cited by examiner

Primary Examiner — Tho D Ta

(57) ABSTRACT

An electrical connector includes a housing that extends between a front and a rear. The housing has a chamber at the rear. The housing has a terminal channel between the front and the rear. A terminal is coupled to the housing. The terminal includes a mating pin at a front of the terminal and a cable connector at a rear of the terminal. The mating pin is positioned in the terminal channel for mating with a charging connector. The cable connector is positioned in the chamber at the rear of the housing. A terminal heat exchanger is positioned in the chamber. The terminal heat exchanger is thermally coupled to the cable connector of the terminal. The terminal heat exchanger has a separator electrically isolating the terminal heat exchanger from the terminal.

22 Claims, 11 Drawing Sheets

TERMINAL HEAT EXCHANGER FOR AN ELECTRICAL CONNECTOR

BACKGROUND OF THE INVENTION

The subject matter herein relates generally to heat exchangers for electrical connectors.

Electrical connectors, such as power connectors, generate heat when current flows through the terminals and cables of the power connectors. For example, an electrical connector of a charging inlet assembly for a battery system of an electric vehicle (EV) or hybrid electric vehicle (HEV) may generate heat through the terminals and the cables of the charging inlet assembly during a charging process. A charging connector is configured to be mated with the terminals of the charging inlet assembly to charge the battery system of the vehicle. It is desirable to increase the current transmitted through the terminals for charging the battery. However, at higher currents, the terminals and the power cables experience an increase in temperature, which may damage the components of the charging inlet assembly.

A need remains for an electrical connector having a cooling system for cooling the terminals of the electrical connector.

BRIEF DESCRIPTION OF THE INVENTION

In one embodiment, an electrical connector is provided. The electrical connector includes a housing that extends between a front and a rear. The housing has a chamber at the rear. The housing has a terminal channel between the front and the rear. A terminal is coupled to the housing. The terminal includes a mating pin at a front of the terminal and a cable connector at a rear of the terminal. The mating pin is positioned in the terminal channel for mating with a charging connector. The cable connector is positioned in the chamber at the rear of the housing. A terminal heat exchanger is positioned in the chamber. The terminal heat exchanger is thermally coupled to the cable connector of the terminal. The terminal heat exchanger has a separator electrically isolating the terminal heat exchanger from the terminal.

In another embodiment, an electrical connector is provided. The electrical connector includes a housing that extends between a front and a rear. The housing has a chamber at the rear. The housing has a terminal channel between the front and the rear. A terminal is coupled to the housing. The terminal includes a mating pin at a front of the terminal and a cable connector at a rear of the terminal. The mating pin is positioned in the terminal channel for mating with a charging connector. The cable connector is positioned in the chamber at the rear of the housing. A terminal heat exchanger is positioned in the chamber. The terminal heat exchanger includes a heat transfer element thermally coupled to the cable connector of the terminal. The terminal heat exchanger includes a separator electrically isolating the heat transfer exchanger from the terminal. The terminal heat exchanger includes a manifold has a flow channel for coolant flow through the manifold. the flow channel provides the coolant in thermal communication with the heat transfer element.

In a further embodiment, an electrical connector is provided. The electrical connector include a housing extends between a front and a rear. The housing has a chamber at the rear. The housing has a terminal channel between the front and the rear. A terminal is coupled to the housing. The terminal includes a mating pin at a front of the terminal and a cable connector at a rear of the terminal. The mating pin is positioned in the terminal channel for mating with a charging connector. The cable connector is positioned in the chamber at the rear of the housing. The cable connector includes a weld tab having a surface configured to be welded to a power cable. A terminal heat exchanger is positioned in the chamber. The terminal heat exchanger is thermally coupled to the weld tab of the cable connector. The terminal heat exchanger includes a manifold that has a flow channel for coolant flow through the manifold. The terminal heat exchanger has a separator between the weld tab and the flow channel for electrically isolating the weld tab from the coolant in the flow channel.

DETAILED DESCRIPTION OF THE INVENTION

Figure 1:
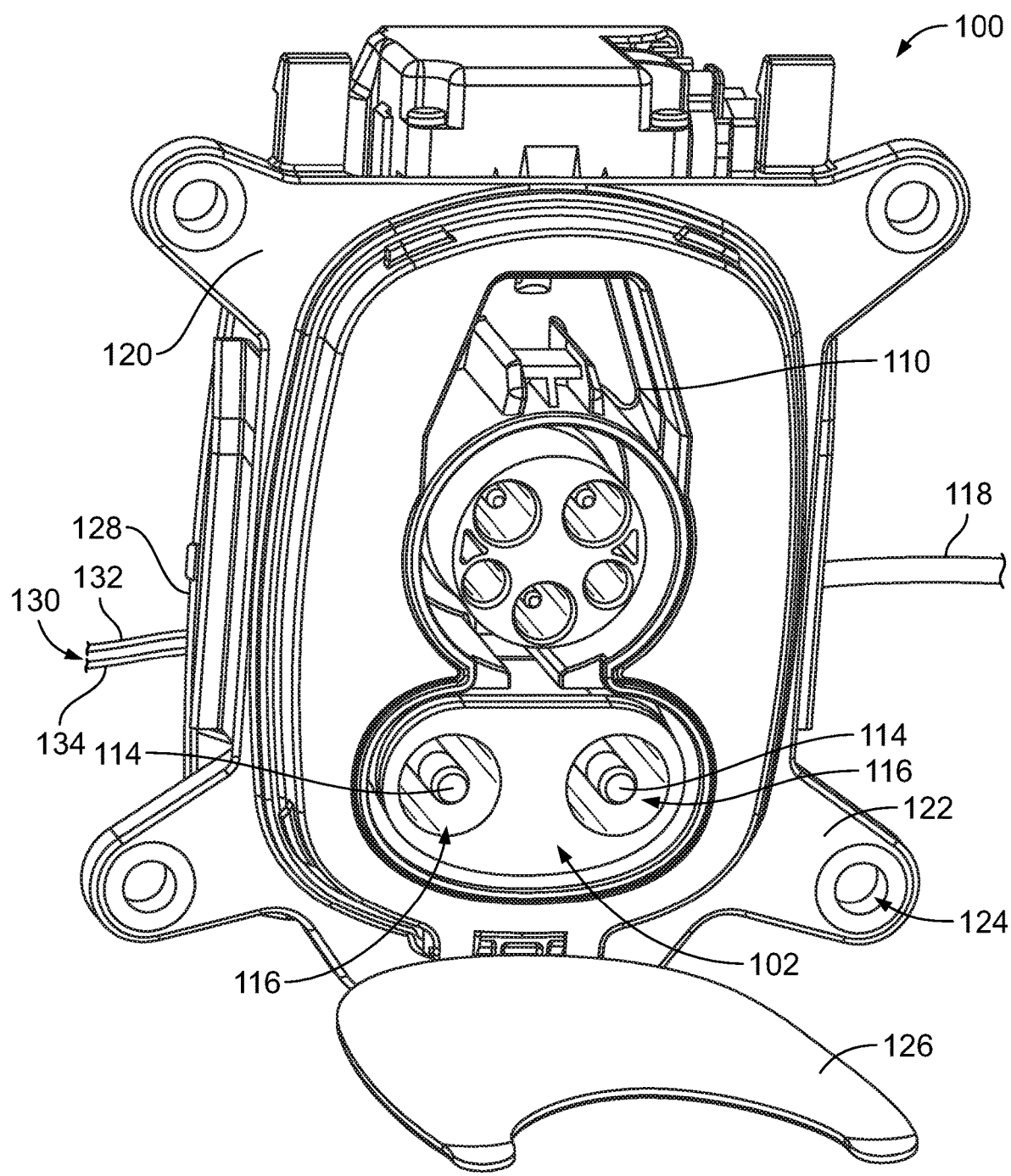
FIG. 1 is a front perspective view of a electrical connector having a cooling system in accordance with an exemplary embodiment such as for a charging inlet assembly.

FIG. 1 is a front perspective view of an electrical connector 102 having a cooling system 130 for cooling components of the electrical connector 102 in accordance with an exemplary embodiment. The electrical connector 102 may be a power connector, such as a power connector of a charging inlet assembly 100. While the electrical connector 102 may be described herein as part of the charging inlet assembly, it is realized that the electrical connector 102 may be another type of electrical connector.

The charging inlet assembly 100 is used as a charging inlet for a vehicle, such as an electric vehicle (EV) or hybrid electric vehicle (HEV). The charging inlet assembly 100 includes an electrical connector 102 configured for mating reception with a charging connector (not shown). In an exemplary embodiment, the electrical connector 102 is configured for mating with a DC fast charging connector, such as the SAE combo CCS charging connector, in addition to AC charging connectors, such as the SAE J1772 charging connector.

The charging inlet assembly 100 includes a housing 110 holding terminals 114 forming part of the electrical connector 102. The terminals 114 are electrically connected to corresponding power cables 118. The terminals 114 are configured to be mated to the charging connector. The terminals 114 are received in terminal channels 116 and coupled to the housing 110 in the terminal channels 116. In an exemplary embodiment, the charging inlet assembly 100 includes the cooling system 130 for actively cooling the terminals 114. For example, coolant may be pumped through lines or channels of the cooling system and flow in thermal communication with the terminals 114 to dissipate heat from the terminals 114. The cooling system 130 may additionally be used for actively cooling the power cables 118 terminated to the terminals 114.

The charging inlet assembly 100 includes a mounting flange 120 coupled to the housing 110. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

The charging inlet assembly 100 includes a terminal cover 126 hingedly coupled to the mounting flange 120 and/or the housing 110. The cover 126 is used to cover corresponding terminals 114. The charging inlet assembly 100 may include a rear cover 128 coupled to a rear of the housing 110 that closes access to the rear of the housing 110. The power cables 118 and/or a coolant supply line 132 and a coolant return line 134 of the cooling system 130 pass through the rear cover 128 and/or sides of the housing 110.

Figure 2:
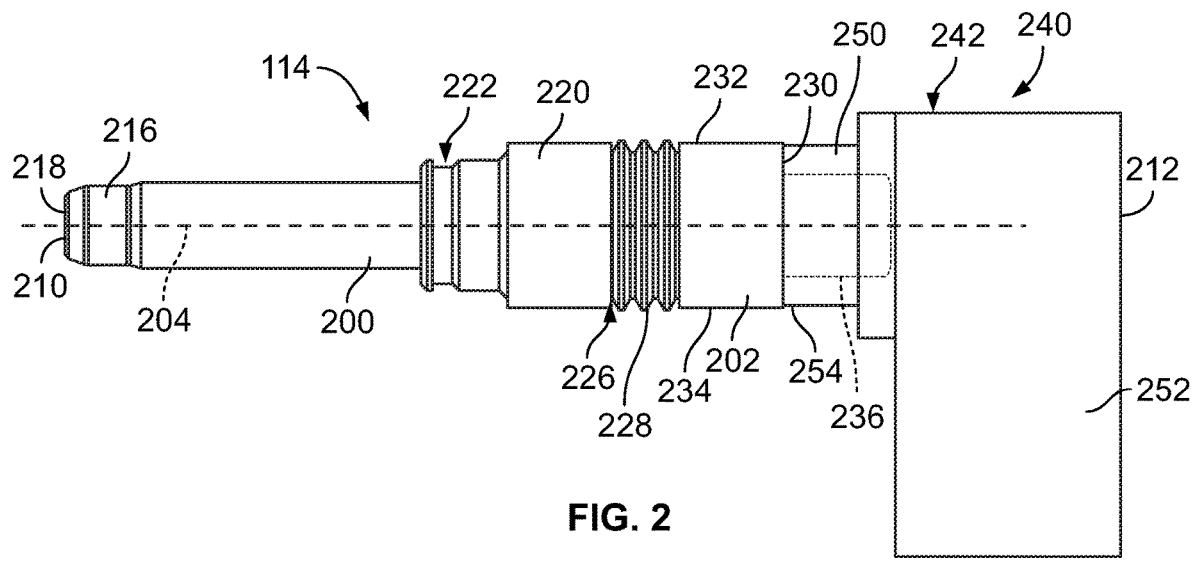
FIG. 2 is a side view of a terminal of the charging inlet assembly in accordance with an exemplary embodiment.

FIG. 2 is a side view of the terminal 114 in accordance with an exemplary embodiment. The terminal 114 includes a mating pin 200 at a front 210 of the terminal 114 and a cable connector 202 at a rear 212 of the terminal 114. The terminal 114 extends along a longitudinal axis 204. The mating pin 200 is configured to be mated to the charging connector. The cable connector 202 is configured to be electrically connected to the power cable 118 (shown in FIG. 1). In an exemplary embodiment, the mating pin 200 and/or the cable connector 202 are configured to be actively cooled by the cooling system 130 (shown in FIG. 1). For example, the cooling system 130 is configured to be thermally coupled to the mating pin 200 and/or the cable connector 202 at the rear 212 of the terminal 114 and coolant of the cooling system 130 is used to dissipate heat from the terminal 114.

In various embodiments, the cable connector 202 is separate and discrete from the mating pin 200 and configured to be mechanically and electrically coupled to the mating pin 200. For example, the cable connector 202 may be press fit onto the mating pin 200. However, the cable connector 202 may be secured to the mating pin 200 by other processes in alternative embodiments, such as friction stir welding, riveting, a bolted joint, and the like. In other various embodiments, the cable connector 202 is integral with the mating pin 200, such as formed with the mating pin 200. In various embodiments, the cable connector 202 is configured to be terminated to the power cable 118 by welding the power cable 118 to the cable connector 202. For example, the cable connector 202 may include a weld tab. In other various embodiments, the cable connector 202 is terminated to the power cable 118 by other processes, such as being crimped, soldered, and the like. For example, the cable connector 202 may include a crimp barrel (FIG. 3) or cable barrel (FIG. 4) configured to be terminated to the power cable 118.

The mating pin 200 is electrically conductive. For example, the mating pin 200 may be manufactured from a metal material, such as a copper material. In an exemplary embodiment, the mating pin 200 is screw machined. The mating pin 200 may be manufactured from a metal alloy (for example, copper alloy) having additives to increase machinability. In an exemplary embodiment, the mating pin 200 is cylindrical. In an exemplary embodiment, the mating pin 200 includes a cap 216 at a tip 218 of the mating pin 200. The cap 216 is manufactured from a dielectric material, such as a plastic material. The cap 216 makes the terminal 114 touch-safe at the front of the housing 110.

The mating pin 200 includes a mounting head 220 for mounting the mating pin 200 in the housing 110. In the illustrated embodiment, the mounting head 220 has a larger diameter than the mating pin 200. In an exemplary embodiment, the mounting head 220 includes a latching groove 222 formed circumferentially around the mounting head 220, such as near a forward end of the mounting head 220. In an exemplary embodiment, the mounting head 220 includes a seal groove 226 that receives a seal 228. The seal 228 may be located near a rear end of the mounting head 220. The seal 228 may have a diameter approximately equal to or slightly larger than a diameter of the mounting head 220 for interface sealing against an interior surface of the terminal channel 116 (shown in FIG. 1).

The cable connector 202 is rearward of the mounting head 220. In an exemplary embodiment, the cable connector 202 includes a mounting shaft 232 extending from the mounting head 220. The mounting shaft 232, in the illustrated embodiment, is integral with the mating pin 200 as a unitary structure. For example, the mounting shaft 232 may be screw machined with the mating pin 200. In other various embodiments, the mounting shaft 232 may be separate and discrete from the mating pin 200 and mechanically coupled to the mating pin 200. The mounting shaft 232 includes an outer surface 234 and extends to a rear flange 230. The outer surface 234 may be cylindrical and may have a similar or same diameter as the mounting head 220. In an exemplary embodiment, the outer surface 234 is configured to be actively cooled by the cooling system 130 to lower an operating temperature of the terminal 114.

The cable connector 202 extends from and/or is coupled to the mounting shaft 232 at the rear flange 230. In an exemplary embodiment, the mounting shaft 232 includes a rear mounting post 236 (shown in phantom) extending rearward from the rear flange 230. The cable connector 202 may be press-fit on the rear mounting post 236. The rear mounting post 236 may be cylindrical, such as to allow the cable connector 202 to be rotatably positionable on the mating pin 200. However, the rear mounting post 236 may have other shapes in alternative embodiments.

The cable connector 202 includes a cable terminating end 240 at the rear 212 of the terminal 114. The power cable 118 is configured to be terminated to the cable terminating end 240. In the illustrated embodiment, the cable connector 202 includes a weld cap 242 at the rear 212 defining the cable terminating end 240. The weld cap 242 is separate and discrete from the mating pin 200 and the mounting shaft 232. In an exemplary embodiment, the weld cap 242 is configured to be actively cooled by the cooling system 130 to lower an operating temperature of the terminal 114.

The weld cap 242 includes a base 250 and a weld pad 252 extending from the base 250. In the illustrated embodiment, the weld pad 252 extends from the base 250 perpendicular to the longitudinal axis 204. However, the weld pad 252 may extend at other angles, such as parallel to the longitudinal axis 204 or at other angles, such as approximately 45° relative to the longitudinal axis 204. The weld pad 252 may be rectangular or have other shapes in alternative embodiments. The weld pad 252 may include planar, parallel surfaces for welding the power cable 118 to the weld pad 252.

The base 250 is coupled to the mounting shaft 232 at the rear mounting post 236. In the illustrated embodiment, the base 250 is cylindrical and includes a rectangular pad at a top of the base 250; however, the base 250 may have other shapes in alternative embodiments. The base 250 has an opening (not shown) that receives the rear mounting post 236. In various embodiments, the base 250 may have a diameter similar to or the same as the diameter of the mounting shaft 232 and/or the mounting head 220. In other various embodiments, the base 250 may be stepped inward or outward relative to the mounting shaft 232 and/or the mounting head 220. The base 250 includes an outer surface 254. In various embodiments, the outer surface 254 may be axially aligned with the outer surface 234 of the mounting shaft 232 as an extension of the outer surface 234 from the rear flange 230. In an exemplary embodiment, the outer surface 254 is configured to be actively cooled by the cooling system 130 to lower an operating temperature of the terminal 114.

Figure 3:
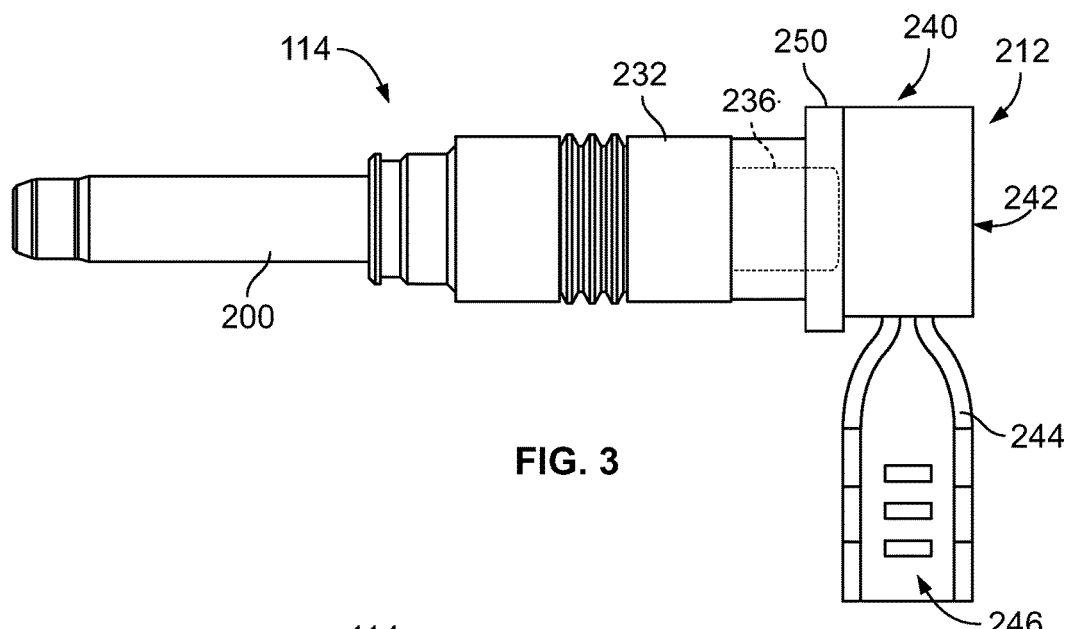
FIG. 3 is a side view of the terminal in accordance with an exemplary embodiment.

FIG. 3 is a side view of the terminal 114 in accordance with an exemplary embodiment. FIG. 3 illustrates the cable terminating end 240 including a crimp contact 244. The crimp contact 244 includes a crimp barrel 246. The crimp barrel 246 is configured to be crimped to the power cable 118 (shown in FIG. 1). In an exemplary embodiment, the crimp contact 244 is separate and discrete from the mating pin 200 and is coupled to the mounting shaft 232 at the rear 212 of the terminal 114. The crimp contact 244 may be coupled to the mounting shaft 232 in a similar manner as the weld cap 242 (shown in FIG. 2). For example, the crimp contact 244 may include the base 250 configured to be press-fit onto the rear mounting post 236 (shown in phantom) and the crimp contact may include a pad at a top of the base 250 with the crimp barrel 246 extending from the pad.

Figure 4:
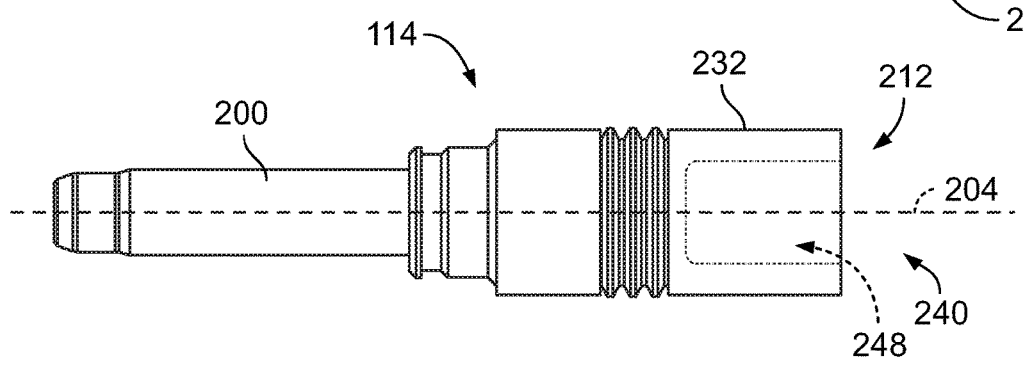
FIG. 4 is a side view of the terminal in accordance with an exemplary embodiment.

FIG. 4 is a side view of the terminal 114 in accordance with an exemplary embodiment. FIG. 4 illustrates the cable terminating end 240 including a cable barrel 248 (shown in phantom) at the rear 212 of the terminal 114. The cable barrel 248 is open at the rear 212 along the longitudinal axis 204. The cable barrel 248 receives the end of the power cable 118 (shown in FIG. 1). The power cable 118 may be soldered or welded to the terminal 114 at the cable barrel 248. In the illustrated embodiment, the cable barrel 248 is defined by the mounting shaft 232 and is integral with the mating pin 200 rather than being a separate component coupled to the rear end of the terminal 114.

Figure 5:
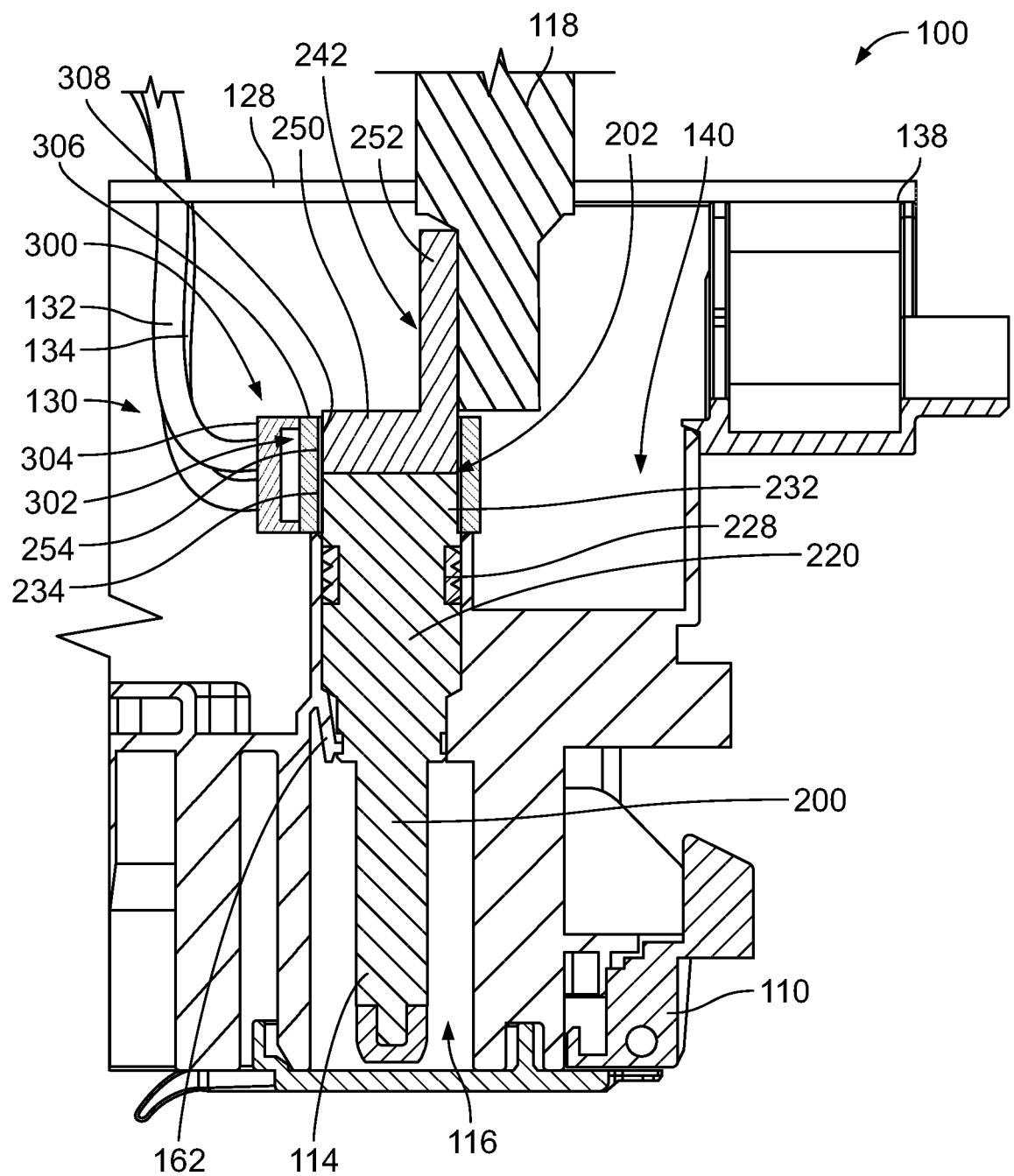
FIG. 5 is a cross-sectional view of the charging inlet assembly in accordance with an exemplary embodiment.

FIG. 5 is a cross-sectional view of the charging inlet assembly 100 in accordance with an exemplary embodiment. FIG. 5 illustrates one of the terminals 114 coupled to the housing 110. The housing 110 extends to a rear 138 and the rear cover 128 is coupled to the housing 110 at the rear 138. The housing 110 has a chamber 140 at the rear 138. The rear cover 128 is rearward of and closes the chamber 140. The rear cover 128 may include cable exits (for example, openings) that receive the power cables 118 and allow the power cables 118 to exit the chamber 140. The rear cover 128 may include coolant line exits (for example, openings) or ports that allow supply and return of the coolant of the cooling system 130 for actively cooling the terminal 114.

The terminal 114 extends into the chamber 140 and the power cable 118 is terminated to the terminal 114 in the chamber 140. The cooling systems 130 interfaces with the terminal 114 in the chamber 140 to provide active cooling for the terminal 114. For example, a terminal heat exchanger 300 is positioned in the chamber 140 to interface with the terminal 114. The terminal heat exchanger 300 is thermally coupled to the terminal 114 to dissipate heat from the terminal 114 and lower the operating temperature of the terminal 114 to improve performance of the charging inlet assembly 100 and/or to allow higher current through the terminal 114 and/or to reduce risk of damage to the terminal 114.

The terminal 114 is received in the corresponding terminal channel 116. The mating pin 200 is located in the terminal channel 116 for interfacing with a charging connector plugged into the housing 110. The housing 110 includes a primary latch 162 extending into the terminal channel 116 to engage and axially retain the terminal 114 in the terminal channel 116. The primary latch 162 may be a deflectable latch. The primary latch 162 may be integral with the housing 110, such as co molded with the housing 110. The primary latch 162 resists rearward pull out of the terminal 114 from the terminal channel 116. The mounting head 220 passes through the terminal channel 116 and engages the housing 110 by an interference fit to tightly hold the terminal 114 in the terminal channel 116. In an exemplary embodiment, the seal 228 is sealed to a surface of the housing 110 defining the terminal channel 116.

In an exemplary embodiment, the terminal 114 is located in the terminal channel 116 such that the cable connector 202 is located immediately rearward of the terminal channel 116.

The cable connector 202 extends into the chamber 140 for electrical connection with the power cable 118 and thermal connection with the cooling system 130. The power cable 118 is coupled to the weld cap 242 within the chamber 140. In an exemplary embodiment, the power cable 118 is ultrasonically welded to the weld pad 252 of the weld cap 242, creating a low resistance interface between the terminal 114 and the power cable 118. In other various embodiments, the power cable 118 may be crimped or otherwise mechanically and electrically terminated to the terminal 114. The outer surface 234 of the mounting shaft 232 is located rearward of the terminal channel 116 in the chamber 140. The outer surface 254 of the base 250 of the weld cap 242 is located rearward of the terminal channel 116 in the chamber 140. The outer surface 234 and/or the outer surface 254 is positioned in the chamber 140 for interfacing with the terminal heat exchanger 300 of the cooling system 130. In various embodiments, the terminal heat exchanger 300 may be directly thermally coupled to the outer surface 234 and/or the outer surface 254 to dissipate heat directly from the terminal 114. In other various embodiments, the terminal heat exchanger 300 may be indirectly thermally coupled to the outer surface 234 and/or the outer surface 254, such as through a thermal interface material, a thermal grease or another thermal bridge. The terminal heat exchanger 300 may be thermally coupled to other parts of the terminal 114 in other various embodiments, such as to the weld pad 252.

The terminal heat exchanger 300 is coupled to the coolant supply line 132 and the coolant return line 134. Coolant flows through the coolant lines 132, 134 to transfer heat from the terminal heat exchanger 300. In an exemplary embodiment, the terminal heat exchanger 300 includes a flow channel 302 in flow communication with the coolant lines 132, 134. The coolant is routed through the flow channel 302 to dissipate heat from the terminal heat exchanger 300 for cooling the terminal 114. In an exemplary embodiment, the terminal heat exchanger 300 includes a manifold 304 and a heat transfer element 306. The heat transfer element 306 is coupled to the terminal 114 in thermal communication with the cable connector 202 of the terminal 114. The manifold 304 is coupled to the heat transfer element 306. The manifold 304 forms the flow channel 302 and the coolant in the flow channel 302 is in thermal communication with the heat transfer element 306 to dissipate heat from the heat transfer element 306 and the cable connector 202. In an exemplary embodiment, the terminal heat exchanger 300 includes a separator 308 electrically isolating the terminal heat exchanger 300 from the terminal 114. The separator 308 is a thermally conductive insulator. For example, the separator 308 may be manufactured from a material that is electrically insulative and highly thermally conductive. The separator 308 may be a thermally conductive epoxy, a thermoplastic material or a thermoset material. The separator may be manufactured from beryllium oxide, aluminum oxide, aluminum nitride, boron nitride silicone, ceramic, Kapton, nylon, polyester, and the like. The separator 308 may be a preformed structure, such as a film, a pad, a sheet, an injection molded piece, and the like. In other various embodiments, the separator 308 may be applied in situ, such as a grease or a paste.

In various embodiments, the cooling system 130 may include a cable heat exchanger (not shown) in addition to or in lieu of the terminal heat exchanger 300. The cable heat exchanger is configured to be coupled in thermal communication with the power cable 118 to dissipate heat directly from the power cable 118. The cable heat exchanger may include a manifold and a heat transfer element similar to the manifold 304 and the heat transfer element 306. The cable heat exchanger may include a separator similar to the separator 308.

Figures 6, 7:
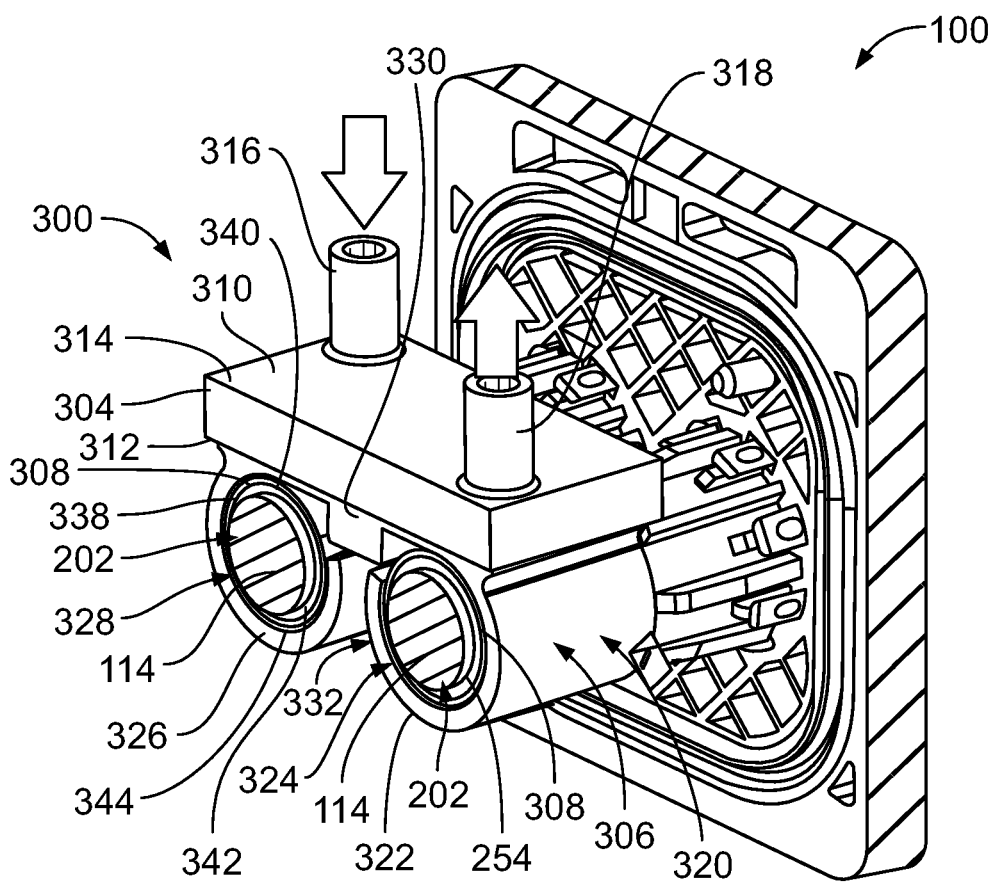
FIG. 6 is a rear perspective, partial sectional view of a portion of the charging inlet assembly showing a terminal heat exchanger in accordance with an exemplary embodiment.
FIG. 7 is a bottom perspective view of a manifold of the terminal heat exchanger in accordance with an exemplary embodiment.

FIG. 6 is a rear perspective, partial sectional view of a portion of the charging inlet assembly 100 showing the terminal heat exchanger 300 coupled to the terminals 114 in accordance with an exemplary embodiment. The terminal heat exchanger 300 is coupled to the terminals 114 in thermal communication with the cable connectors 202.

The manifold 304 includes a manifold body 310 extending between an inner surface 312 and an outer surface 314. The inner surface 312 faces the heat transfer element 306. The flow channel 302 (shown in FIG. 5) is defined by the manifold body 310 between the inner surface 312 and the outer surface 314. In an exemplary embodiment, the flow channel 302 is open at the inner surface 312 for direct thermal contact with and flow along the heat transfer element 306. In an exemplary embodiment, the manifold 304 includes a manifold inlet 316 and a manifold outlet 318. The flow channel 302 extends between the manifold inlet 316 and the manifold outlet 318. The manifold inlet 316 is configured to be coupled to the coolant supply line 132 (shown in FIG. 5). The manifold outlet 318 is configured to be coupled to the coolant return line 134 (shown in FIG. 5). For example, the manifold inlet 316 and the manifold outlet 318 may be nozzles or nipples extending from the outer surface 314 of the manifold body 310. The coolant supply and return lines 132, 134 may be hoses configured to be fit on the manifold inlet 316 and the manifold outlet 318, respectively. Clamps may be used to secure the hoses in place. Other types of fluid connections may be made between the coolant supply and return lines 132, 134 and the manifold 304. In the illustrated embodiment, the manifold 304 is used for cooling multiple terminals 114. In alternative embodiments, each terminal 114 may include a separate terminal heat exchanger 300 and/or manifold 304.

In an exemplary embodiment, the heat transfer element 306 includes a clip 320 (also shown in FIG. 8) coupled to the cable connectors 202 of the terminals 114. The manifold 304 is coupled to the clip 320. In various embodiments, the manifold 304 may be latchably coupled to the clip 320. In other various embodiments, the manifold 304 may be coupled to the clip 320 using fasteners or other securing means. In an exemplary embodiment, a seal 358 (shown in FIG. 9) is provided between the manifold 304 and the clip 320 to prevent leakage of the coolant from the flow channel 302.

The clip 320 includes a first clip arm 322 having a first bore 324 receiving one of the cable connectors 202. The clip 320 includes a second clip arm 326 having a second bore 328 receiving the other of the cable connectors 202. The clip 320 is manufactured from a thermally conductive material, such as a metal material or a thermally conductive plastic material. The clip 320 is manufactured from a material having a high convective heat transfer coefficient to transfer heat from the terminals 114 to the coolant flowing through the flow channel 302.

The clip arms 322, 326 extend at least partially circumferentially around the cable connectors 202. The clip arms 322, 326 are used to mechanically secure the clip 320 to the terminals 114. In an exemplary embodiment, the clip arms 322, 326 are thermally coupled to the cable connectors 202 to dissipate heat from the cable connectors 202. The clip arms 322, 326 each have a large surface area in thermal contact with the corresponding cable connector 202. In an exemplary embodiment, the clip arms 322, 326 are split from a base 330 of the clip 320 such that each clip arm 322, 326 has a fixed end and a free end. The clip arms 322, 326 may be spread apart for loading the cable connectors 202 into the first and second bores 324, 328. The clip arms 322, 326 may snap or clip onto the cable connectors 202 to physically couple the clip 320 to the cable connectors 202. In an exemplary embodiment, the clip arms 322, 326 are compressed against the cable connectors 202 and/or the separators 308 positioned between the cable connectors 202 and the clip arms 322, 326. In an exemplary embodiment, a fastener 332 is used for securing and/or tightening the clip arms 322, 326 against the separators 308 and the cable connectors 202. For example, the fastener 332 may be a threaded fastener threadably coupled to the base 330 and tightened to compress the clip arms 322, 326 against the separators 308 and the cable connectors 202.

The separator 308 is coupled to the cable connector 202, such as to the outer surface 254, and may be coupled to the outer surface 234 of the mounting shaft 232 (both shown in FIG. 2). The separator 308 is located between the cable connector 202 and the clip 320 of the heat transfer element 306. The separator 308 forms a thermal bridge between the cable connector 202 and the clip 320 of the heat transfer element 306. The separator 308 electrically isolates the terminal 114 from the heat transfer element 306. In an exemplary embodiment, the separator 308 includes a ring 338 having an opening receiving the cable connector 202 of the corresponding terminal 114. In the illustrated embodiment, the ring 338 extends entirely circumferentially around the cable connector 202.

In the illustrated embodiment, the separator 308 includes a film 340 wrapped around the terminal 114. The film 340 includes an adhesive layer 342 and an isolation layer 344. The isolation layer 344 is an electrical insulator. The isolation layer 344 is thermally conductive. In an exemplary embodiment, the isolation layer 344 is a thermally conductive thermoplastic sheet. Other types of separators 308 may be provided in alternative embodiments. In various alternative embodiments, the separator 308 may be insert molded around the terminal 114 rather than being a film wrapped around the terminal 114.

FIG. 7 is a bottom perspective view of the manifold 304 of the terminal heat exchanger 300 in accordance with an exemplary embodiment. The flow channel 302 is defined by the manifold 304 and open at the inner surface 312 of the manifold body 310. In an exemplary embodiment, the flow channel 302 is defined by dividing walls 350 forming a serpentine path at the inner surface 312 defining the flow channel 302. The flow channel 302 extends from the manifold inlet 316 to the manifold outlet 318. The thickness of the dividing walls 350 controls the height of the flow channel 302, which controls the volume of coolant flowing through the manifold 304.

In an exemplary embodiment, the manifold 304 includes a seal pocket 352 configured to receive a gasket, O-ring, or other type of seal (not shown) for sealing against the heat transfer element 306 (shown in FIG. 6).

The manifold 304 may have other shapes or sizes in alternative embodiments. The manifold 304 may include securing features (not shown) for securing the manifold 304 to the heat transfer element 306. For example, the manifold 304 may include latches, fasteners, or other types of securing features.

Figure 8:
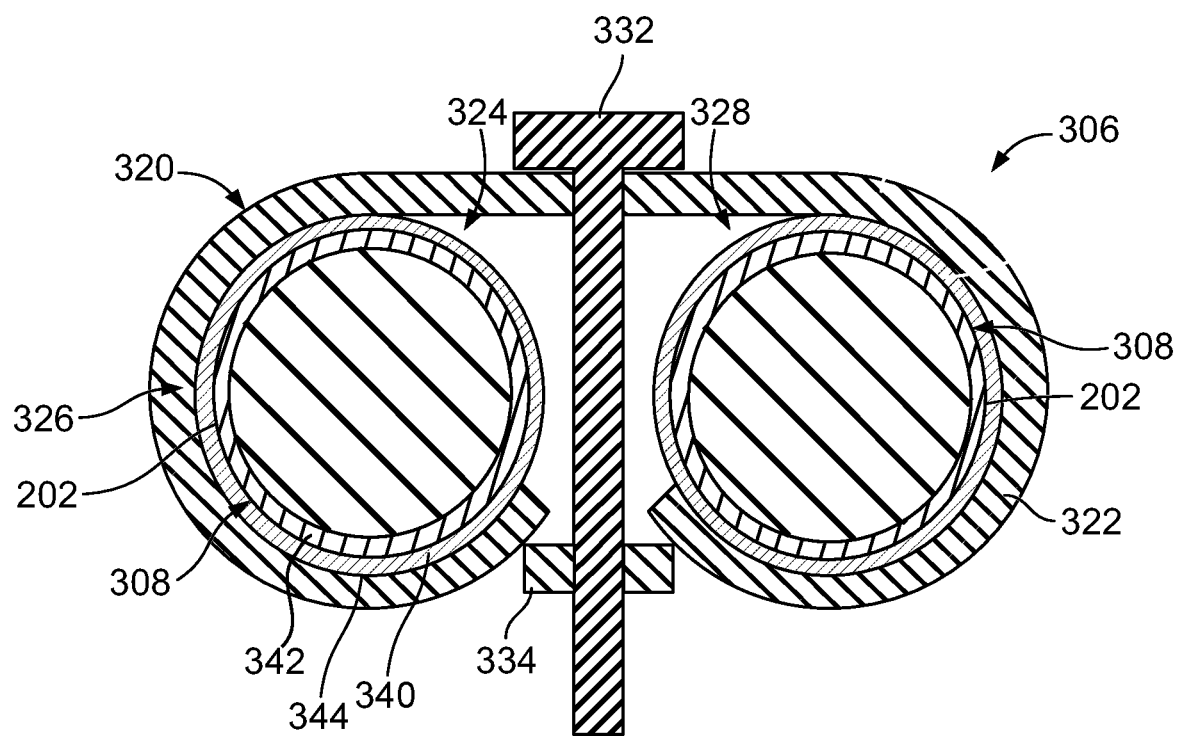
FIG. 8 is a cross-sectional view of the heat transfer element in accordance with an exemplary embodiment.

FIG. 8 is a cross-sectional view of the heat transfer element 306 in accordance with an exemplary embodiment. FIG. 8 illustrates the fastener 332 coupled to the clip 320. The cable connectors 202 are shown in the first and second bores 324, 328. The fastener 332 is configured to engage the clip arms 322, 326 to tighten and compress the clip arms 322, 326 around the separators 308 and the cable connectors 202. For example, a nut 334 coupled to the fastener 332 may be tightened to engage and compress the clip arms 322, 326 against the separators 308 and the cable connectors 202. The clip arms 322, 326 are compressed into thermal engagement with the separators 308 to provide efficient heat transfer from the cable connectors 202 to the clip 320. FIG. 8 illustrates the separator 308 including the adhesive layer 342 and the isolation layer 344 of the film 340. The separator 308 may include other layers in alternative embodiments. The separator 308 may include a single layer in other various embodiments.

Figure 9:
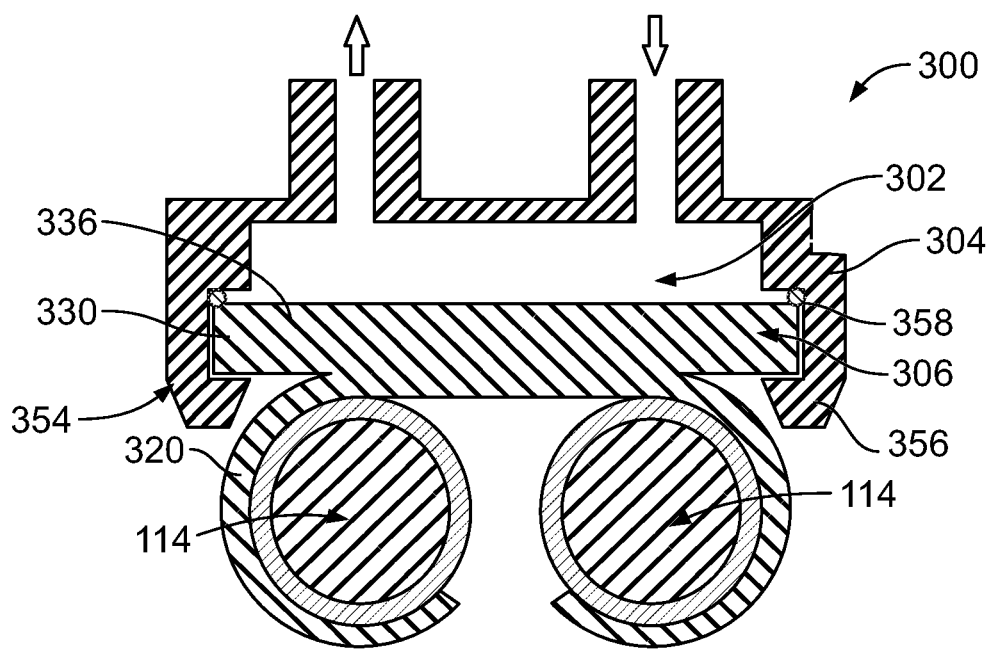
FIG. 9 is a cross-sectional view of the terminal heat exchanger in accordance with an exemplary embodiment.

FIG. 9 is a cross-sectional view of the terminal heat exchanger 300 in accordance with an exemplary embodiment. FIG. 9 illustrates the manifold 304 mounted to the heat transfer element 306. The manifold 304 is coupled to the base 330 of the clip 320. The flow channel 302 is located above a heat transfer surface 336 of the base 330. The coolant is configured to flow along the heat transfer surface 336 to extract heat from the heat transfer element 306 to lower the temperature of the heat transfer element 306, and thus lower the temperature of the terminals 114.

In an exemplary embodiment, the manifold 304 includes securing elements 354 for securing the manifold 304 to the clip 320. In the illustrated embodiment, the securing elements 354 include latches 356 that are latchably coupled to the base 330 of the clip 320. A seal 358 is provided at the interface between the manifold 304 and the heat transfer element 306. The seal 358 sealing the engages the manifold 304 and the heat transfer element 306 to prevent leakage of the coolant from the flow channel 302. The seal 358 may be compressed when the securing elements 354 are secured to the heat transfer element 306.

Figure 10:
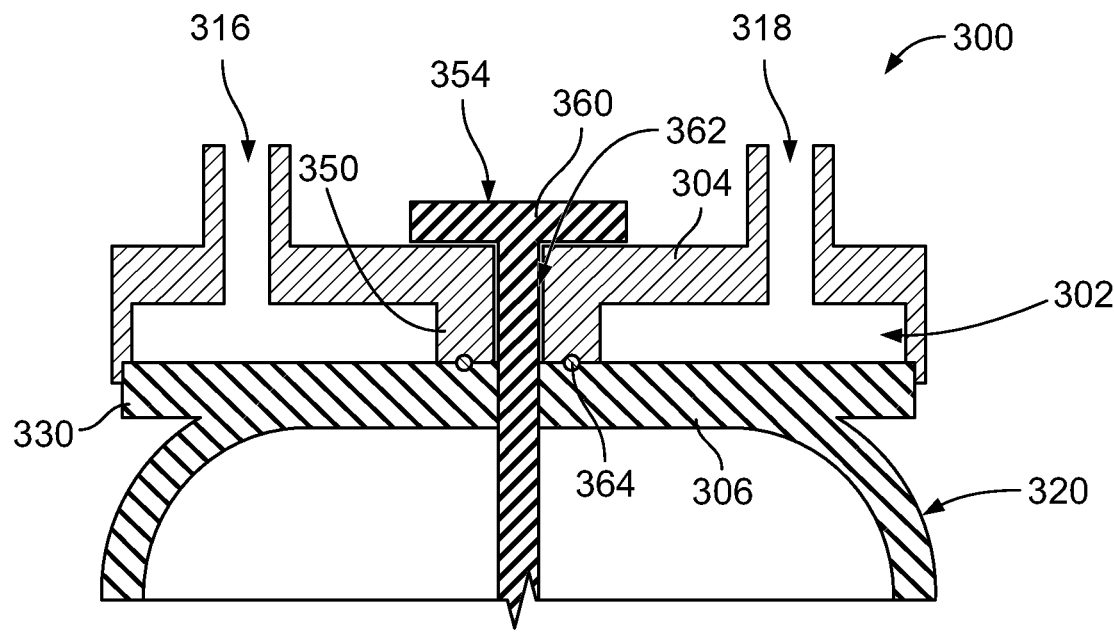
FIG. 10 is a cross-sectional view of the terminal heat exchanger and accordance with an exemplary embodiment.

FIG. 10 is a cross-sectional view of the terminal heat exchanger 300 and accordance with an exemplary embodiment. FIG. 10 illustrates the manifold 304 mounted to the heat transfer element 306 with the flow channel 302 extending from the manifold inlet 316 to the manifold outlet 318. In the illustrated embodiment, the securing element 354 includes a fastener 360, such as a threaded fastener, coupled to the manifold 304 and the base 330 of the clip 320. The fastener 360 passes through a bore 362 in the manifold 304. The bore 362 may be defined by one or more of the dividing walls 350. In an exemplary embodiment, a seal 364 is provided around the bore 362 to prevent leakage of the coolant from the flow channel 302.

Figure 11:
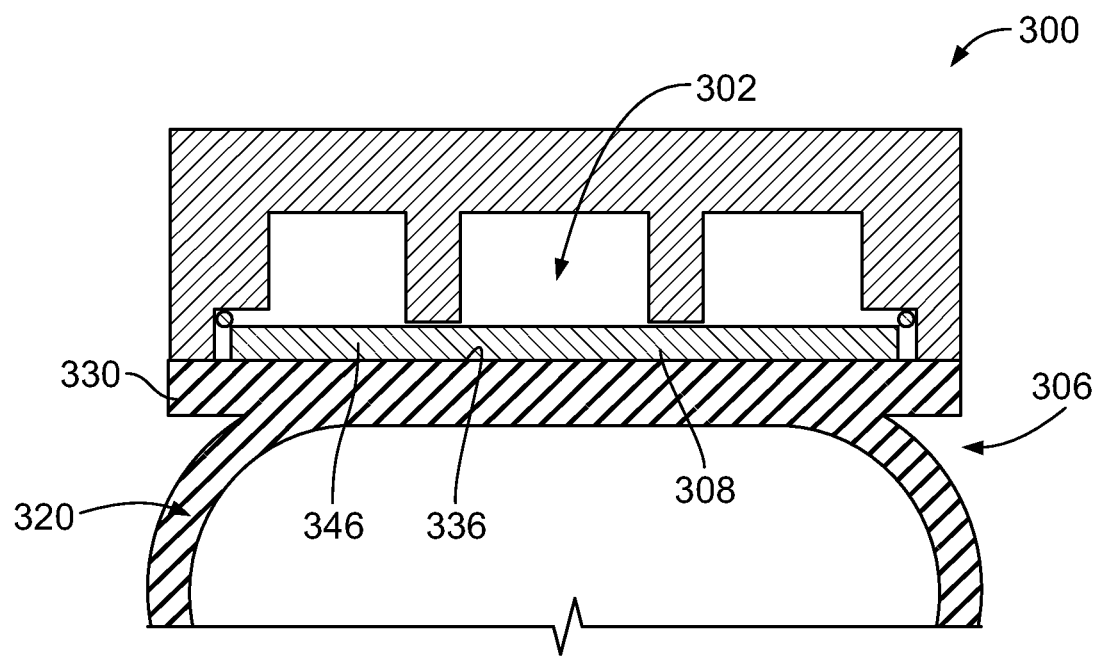
FIG. 11 is a cross-sectional view of the terminal heat exchanger in accordance with an exemplary embodiment.

FIG. 11 is a cross-sectional view of the terminal heat exchanger 300 in accordance with an exemplary embodiment. FIG. 11 illustrates the separator 308 positioned between the heat transfer element 306 and the coolant in the flow channel 302. In the illustrated embodiment, the separator 308 includes a film 346 extending along the heat transfer surface 336 of the base 330 of the clip 320. The film 346 may be used in addition to or in lieu of separators between the clip 320 and the cable connectors 202. The film 346 electrically isolates the clip 320 from the coolant in the flow channel 302. In an exemplary embodiment, the film 346 is thermally conductive providing efficient heat transfer between the base 330 and the coolant in the flow channel 302.

Figure 12:
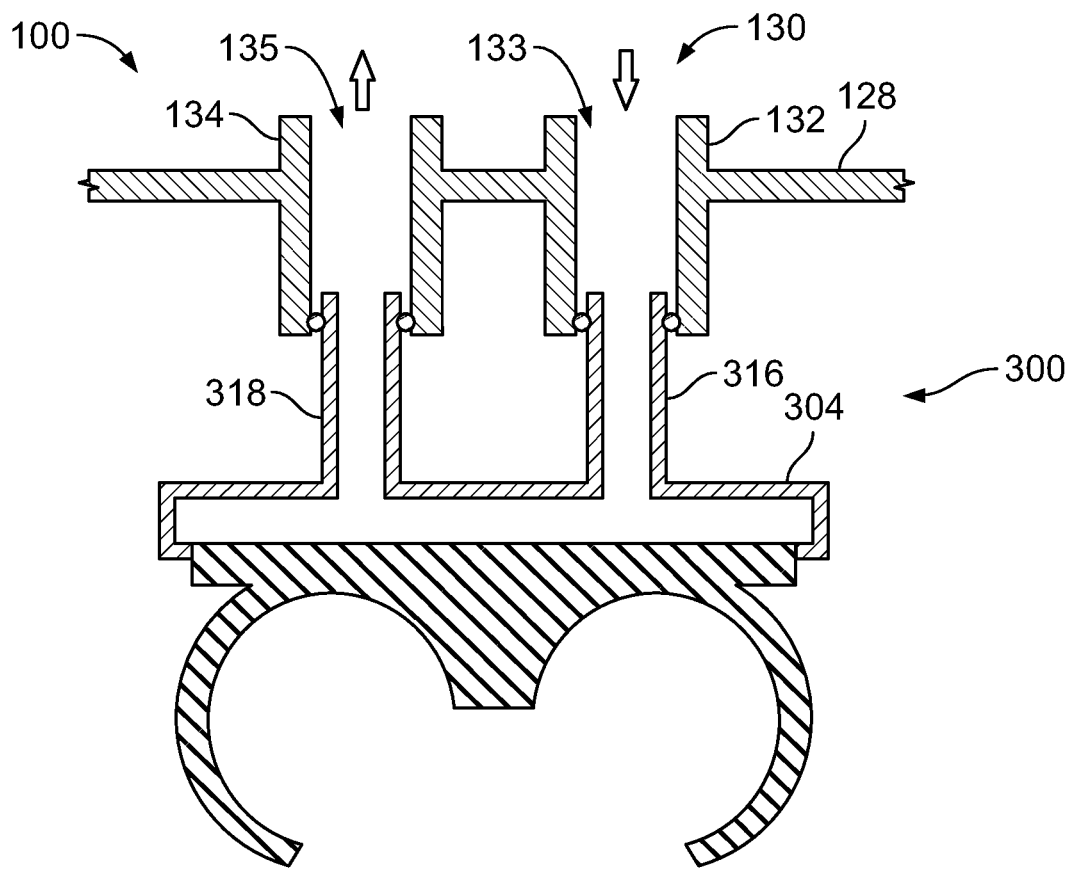
FIG. 12 is a cross-sectional view of a portion of the charging inlet assembly showing the cooling system interfacing with the terminal heat exchanger in accordance with an exemplary embodiment.

FIG. 12 is a cross-sectional view of a portion of the charging inlet assembly 100 showing the cooling system 130 interfacing with the terminal heat exchanger 300 in accordance with an exemplary embodiment. In the illustrated embodiment, the coolant supply line 132 and the coolant return line 134 are integral with the rear cover 128 rather than being separate hoses passing through the rear cover 128 being separately coupled to the manifold 304.

The coolant supply line 132 is defined by a supply port 133 and the coolant return line 134 is defined by a return port 135 of the rear cover 128. The supply port 133 and the return port 135 are integral with the rear cover 128, such as being molded with the rear cover 128. The supply port 133 is coupled to the manifold inlet 316 had a sealed interface. The return port 135 is coupled to the manifold outlet 318 at a sealed interface. In an exemplary embodiment, the supply port 133 and the return port 135 are coupled to the manifold 304 when the rear cover 128 is installed and coupled to the housing 110 (shown in FIG. 5). Hoses or other coolant lines may be coupled to the supply port 133 and the return port 135 from the exterior of the rear cover 128.

Figure 13:
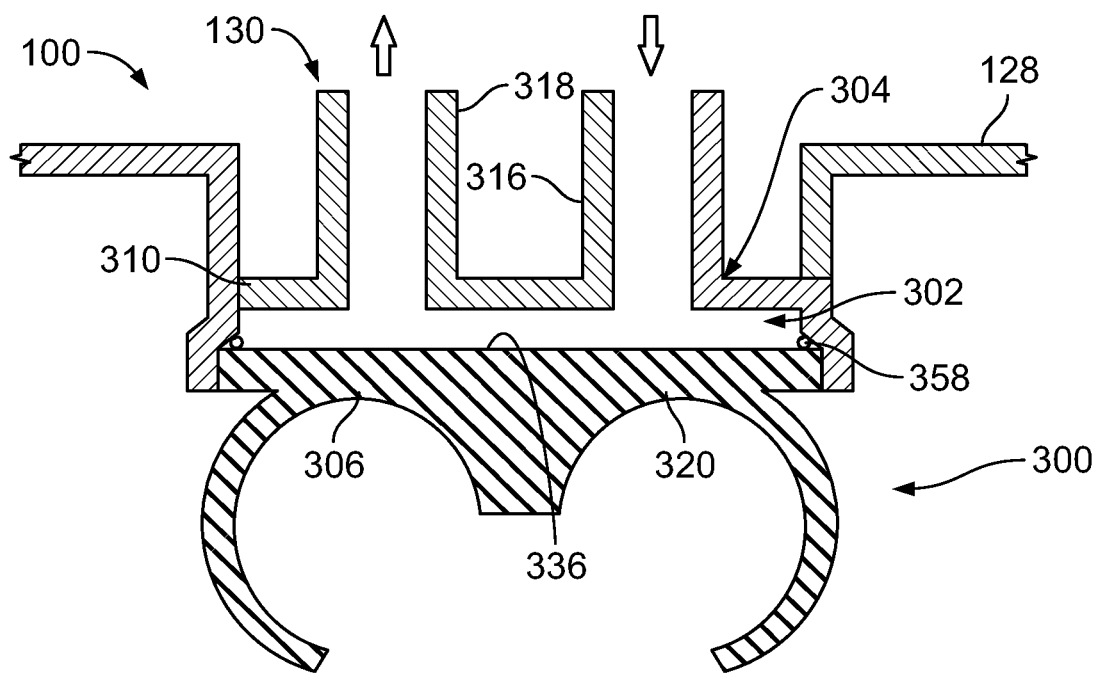
FIG. 13 is a cross-sectional view of a portion of the charging inlet assembly showing the cooling system interfacing with the terminal heat exchanger in accordance with an exemplary embodiment.

FIG. 13 is a cross-sectional view of a portion of the charging inlet assembly 100 showing the cooling system 130 interfacing with the terminal heat exchanger 300 in accordance with an exemplary embodiment. In the illustrated embodiment, the manifold 304 is integral with the rear cover 128. The rear cover 128 includes walls defining the manifold body 310, the manifold inlet 316, and the manifold outlet 318. The rear cover 128 is coupled directly to the heat transfer element 306. The rear cover 128 forms the flow channel 302 along the heat transfer surface 336 of the clip 320. The seal 358 is provided between the rear cover 128 and the clip 320 to seal the flow channel 302.

Figure 14:
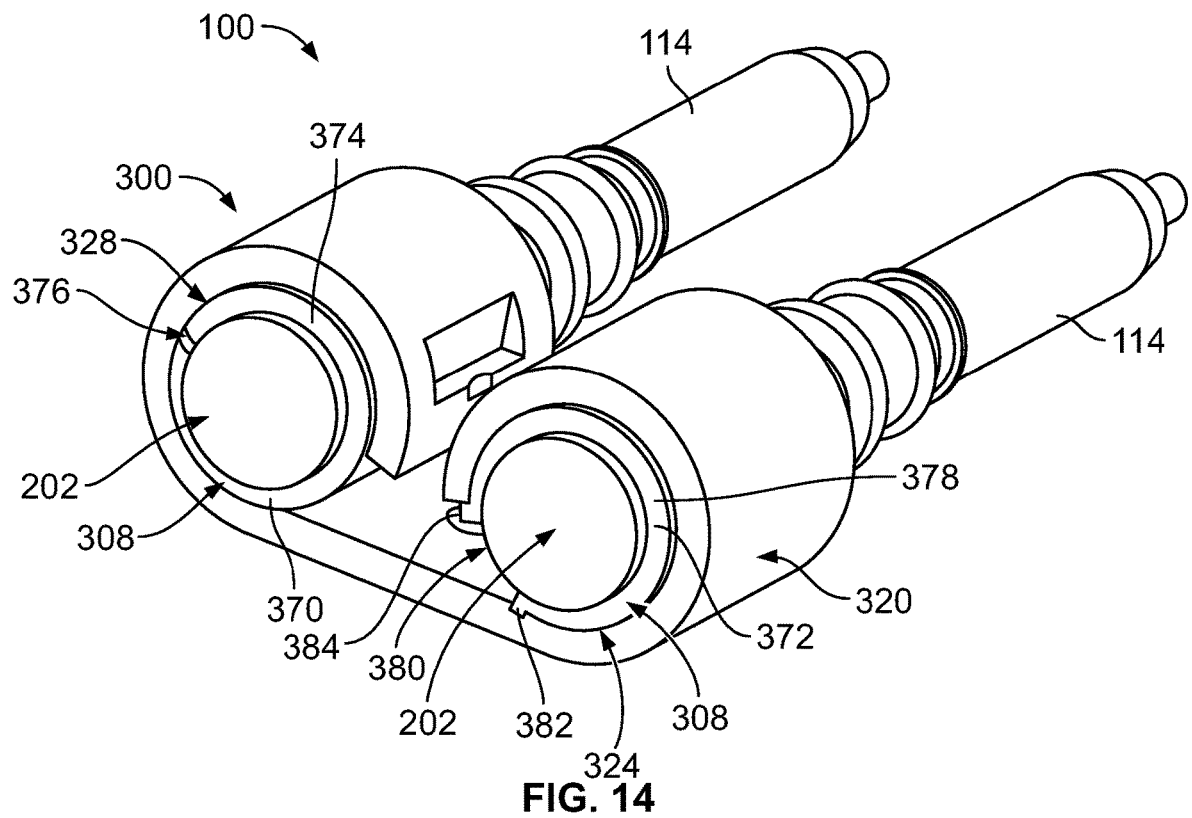
FIG. 14 is a rear perspective view of a portion of the charging inlet assembly illustrating the terminal heat exchanger coupled to the terminals in accordance with an exemplary embodiment.

FIG. 14 is a rear perspective view of a portion of the charging inlet assembly 100 illustrating the terminal heat exchanger 300 coupled to the terminals 114 showing various embodiments of the separators 308 in accordance with an exemplary embodiment. In the illustrated embodiment, the separators 308 include a first separator 370 and a second separator 372. In other embodiments, the separators 308 may include first separators 370 in both bores 324, 328 or second separators 372 in both bores 324, 328.

The first separator 370 includes a split ring 374 having a seam 376 extending longitudinally along the split ring 374. In an exemplary embodiment, the split ring 374 is a preformed component, such as a molded component, having a ring shape. The split ring 374 may be clipped onto the cable connector 202. In an exemplary embodiment, the split ring 374 is compressible around the cable connector 202 when the clip 320 is tightened around the first separator 370.

The second separator 372 includes a split ring 378 having a gap 380 extending longitudinally along the split ring 378. The split ring 378 includes flanges 382, 384 at opposite ends of the split ring 378. The flanges 382, 384 oppose each other across the gap 380 area the clip 320 is configured to engage the flanges 382, 384 to compress the second separator 372 around the cable connector 202 when the clip 320 is tightened around the second separator 372.

Figure 15:
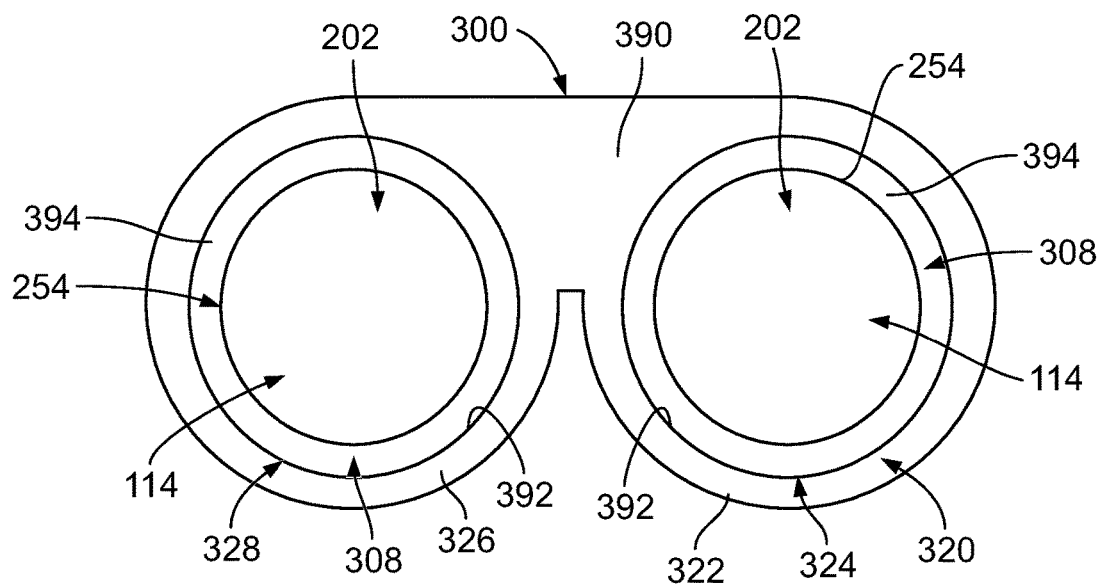
FIG. 15 is a rear view of the terminal heat exchanger in accordance with an exemplary embodiment.

FIG. 15 is a rear view of the terminal heat exchanger 300 in accordance with an exemplary embodiment. In the illustrated embodiment, the clip 320 includes a solid body 390 forming the first and second bores 324, 328. The clip arms 322, 326 are fixed relative to each other and the terminals 114 rather than being compressible. In an exemplary embodiment, the body 390 is an extruded body.

In an exemplary embodiment, the separators 308 are formed in place between the body 390 of the clip 320 and the terminals 114. The separators 308 include separator bodies 394 creating thermal bridges between the terminals 114 and the clip 320. For example, the separator bodies 394 of the separators 308 may be injection molded into the first and second bores 324, 328 to fill the space between the outer surfaces 254 of the cable connectors 202 and inner surfaces 392 of the bores 324, 328. The separator bodies 394 are formed in place between the terminals 114 and the clip 320 to completely fill the spaces between the cable connectors 202 and the clip 320 for efficient thermal bridging between the cable connectors 202 and the clip 320.

Figure 16:
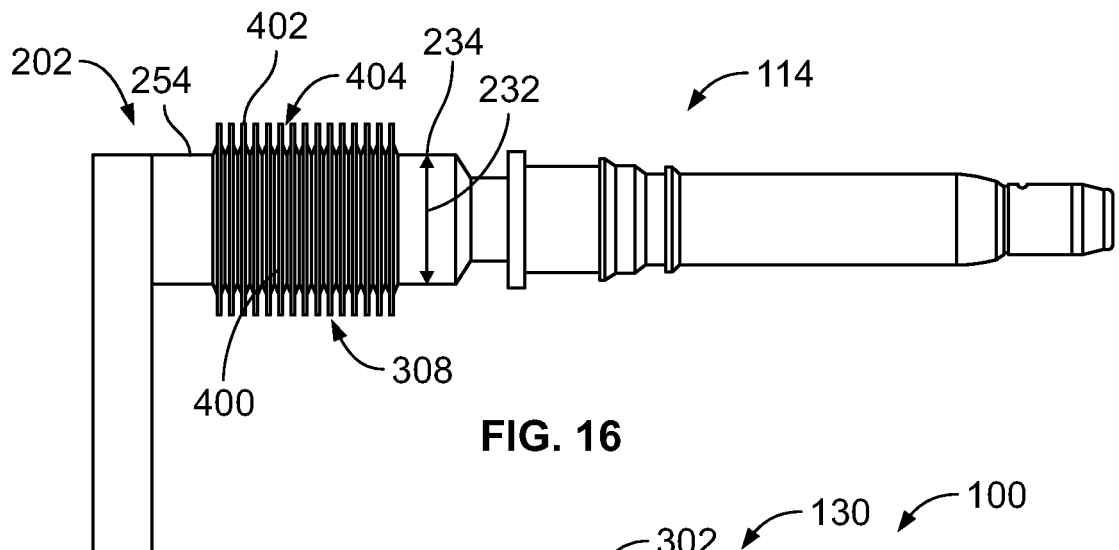
FIG. 16 is a side view of one of the terminals in accordance with an exemplary embodiment in accordance with an exemplary embodiment.

FIG. 16 is a side view of one of the terminals 114 in accordance with an exemplary embodiment showing the corresponding separator 308 provided at the rear end of the terminal 114. The separator 308 is coupled to the outer surface 254 of the cable connector 202 and the outer surface 234 of the mounting shaft 232. In an exemplary embodiment, the separator 308 includes a ring 400 having a plurality of radial fins 402 separated by fin channels 404. The ring 400 is configured to be in direct thermal contact with the coolant of the cooling system. For example, the coolant flows within the fin channels 404 between the radial fins 402.

Figure 17:
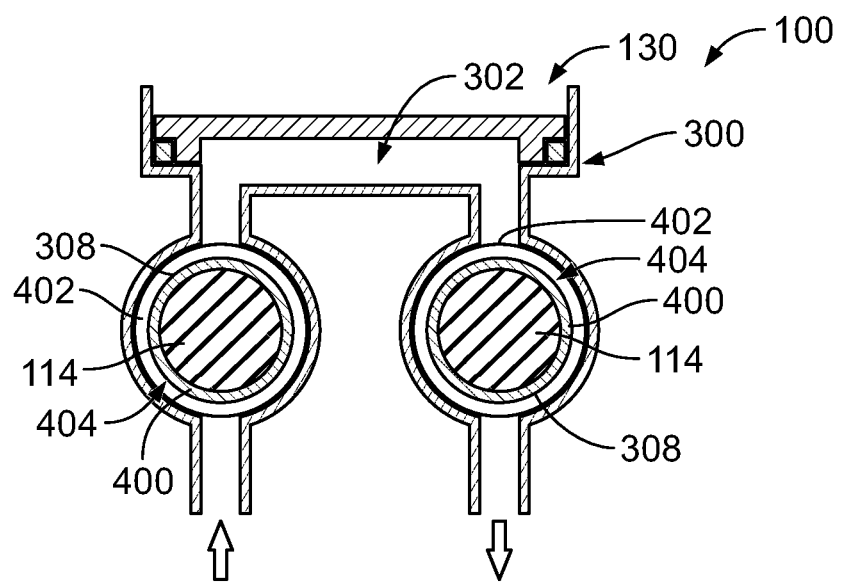
FIG. 17 is a cross-sectional view of a portion of the charging inlet assembly showing the cooling system interfacing with the terminal heat exchanger in accordance with an exemplary embodiment.

FIG. 17 is a cross-sectional view of a portion of the charging inlet assembly 100 showing the cooling system 130 including the ring 400 shown in FIG. 17 interfacing with the terminal heat exchanger 300 in accordance with an exemplary embodiment. The terminal heat exchanger 300 includes the flow channel 302 allowing the coolant flow through the ring 400 of the separator 308. The flow channel 302 extends across the terminal 114 to allow the coolant flow through the fin channels 404 across the radial fins 402 of the ring 400. In the illustrated embodiment, the flow channel 302 has an inlet side flowing across one of the terminals 114 and a return side flowing across the other of the terminals 114. Other arrangements of the flow channel 302 are possible in alternative embodiments, such as parallel flow rather than series flow.

Figure 18:
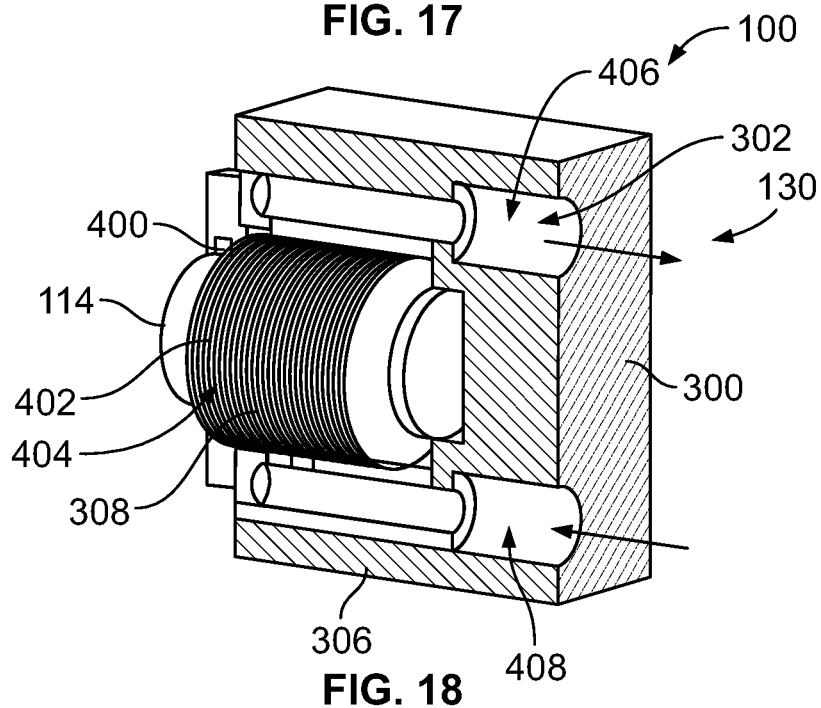
FIG. 18 is a rear perspective, partial sectional view of a portion of the charging inlet assembly showing the cooling system interfacing with the terminal heat exchanger in accordance with an exemplary embodiment.

FIG. 18 is a rear perspective, partial sectional view of a portion of the charging inlet assembly 100 showing the cooling system 130 including the ring shown in FIG. 16 interfacing with the terminal heat exchanger 300 in accordance with an exemplary embodiment. The terminal heat exchanger 300 includes the flow channel 302 allowing the coolant flow through the ring 400 of the separator 308. The flow channel 302 extends across the terminal 114 to allow the coolant flow through the fin channels 404 across the radial fins 402 of the ring 400. In the illustrated embodiment, the heat transfer element 306 includes a supply channel 406 and a return channel 408 formed in the heat transfer element 306. The coolant flows from the supply channel 406 to the return channel 408 across the ring 400 of the separator 308.

Figure 19:
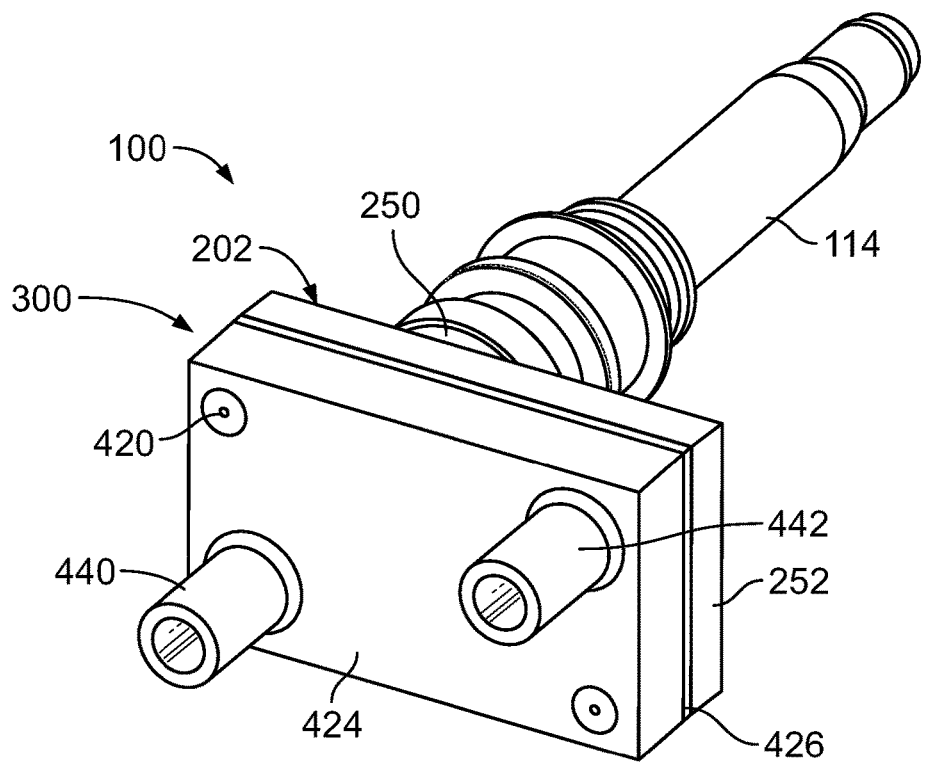
FIG. 19 is a rear perspective view of a portion of the charging inlet assembly illustrating the terminal heat exchanger in accordance with an exemplary embodiment.
Figure 20:
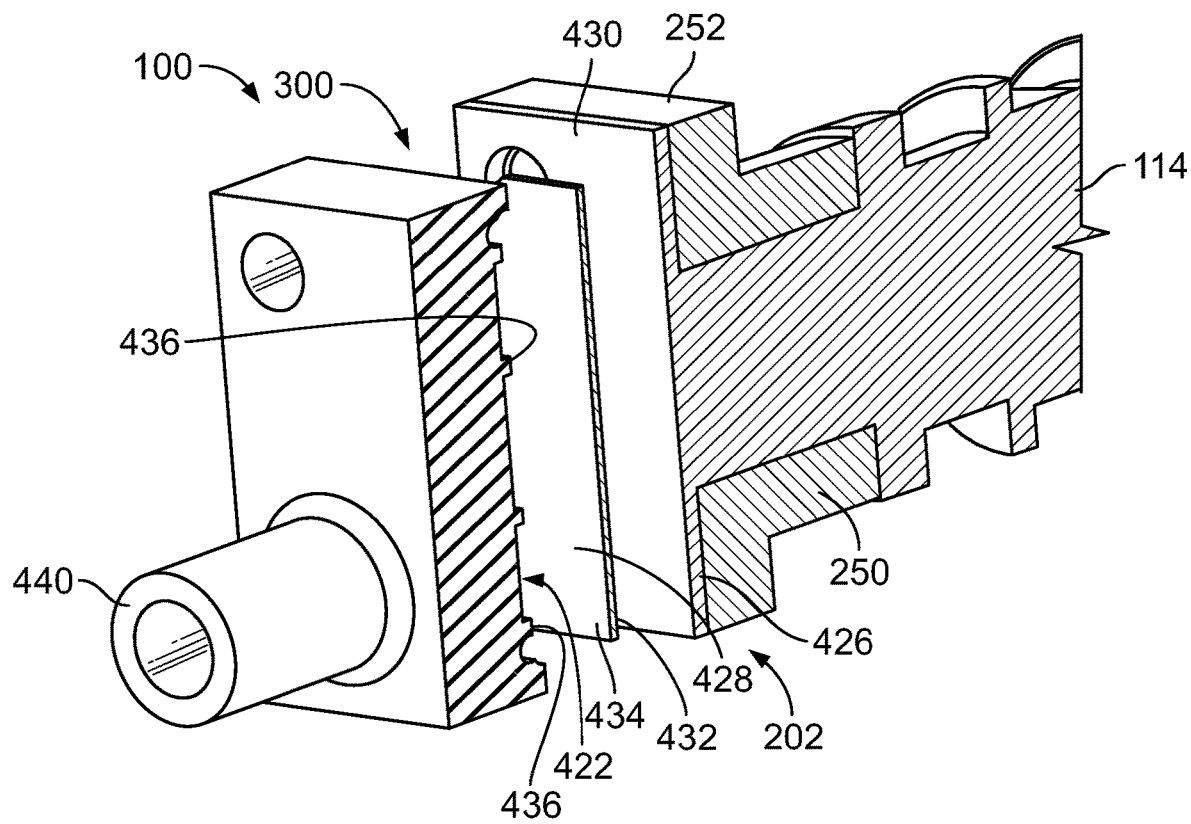
FIG. 20 is a rear perspective, partial sectional, exploded view of a portion of the charging inlet assembly illustrating the terminal heat exchanger coupled in accordance with an exemplary embodiment.

FIG. 19 is a rear perspective view of a portion of the charging inlet assembly 100 illustrating the terminal heat exchanger 300 coupled to one of the terminals 114. FIG. 20 is a rear perspective, partial sectional, exploded view of a portion of the charging inlet assembly 100 shown in FIG. 19 illustrating the terminal heat exchanger 300 coupled to one of the terminals 114. In the illustrated embodiment, the terminal heat exchanger 300 is coupled to the weld pad 252 of the cable connector 202 rather than being coupled to the base 250. The terminal heat exchanger 300 is used for dissipating heat directly from the weld pad 252 rather than dissipating heat directly from the base 250. The weld pad 252 provides a large surface area for heat transfer. The weld pad 252 provides a planar surface for mechanically and thermally coupling the terminal heat exchanger 300 to the terminal 114. In an exemplary embodiment, the terminal heat exchanger 300 is coupled to the weld pad 252 using fasteners 420.

The terminal heat exchanger 300 includes a flow channel 422 (FIG. 20) formed in a manifold 424 of the terminal heat exchanger 300. The terminal heat exchanger 300 includes a heat transfer element 426 and a separator 428 between the heat transfer element 426 and the flow channel 422 of the manifold 424. In an exemplary embodiment, the heat transfer element 426 is a thermal gasket 430 coupled to the weld pad 252. For example, the thermal gasket 430 may be a metal sheet or plate. The thermal gasket 430 may be a film or thermal grease in alternative embodiments. In other various embodiments, the weld pad 252 defines the heat transfer element 426 rather than having a separate heat transfer element 426 provided at the outer surface of the weld pad 252.

The separator 428 electrically isolates the heat transfer element 426 from the coolant in the flow channel 422. The separator 428 is a thermally conductive insulator. For example, the separator 428 may be manufactured from a material that is electrically insulative and highly thermally conductive. The separator 428 may be a thermally conductive epoxy, a thermoplastic material or a thermoset material. The separator 428 may be a preformed structure, such as a film, a pad, a sheet, an injection molded piece, and the like. In other various embodiments, the separator 428 may be applied in situ, such as a grease or a paste.

The separator 428 includes an inner surface 432 and an outer surface 434. The inner surface 432 faces and abuts against the thermal gasket 430. The inner surface 432 is in direct physical contact with the thermal gasket 430 for efficient thermal transfer between the thermal gasket 430 and the separator 428. The outer surface 434 faces the flow channel 422. The outer surface defines a heat transfer surface of the separator 428. The coolant flows along the outer surface 434 to dissipate heat from the separator 428, and thus the thermal gasket 430 and the weld pad 252. In an exemplary embodiment, the manifold 424 includes locating features 436 extending into the flow channel 422 to engage the separator 428. The locating features 436 press against the separator 428 to hold the separator 428 in direct physical contact with the thermal gasket 430 to ensure efficient heat transfer between the coolant and the thermal gasket 430. The locating features 436 prevent warpage or buckling of the separator 428. The locating features 436 press the separator 428 against the thermal gasket 430. The locating features 436 may be posts extending into the flow channel 422 such that the coolant is allowed to flow around the posts. In other various embodiments, the locating features 436 form divider walls that define a predetermined flow channel 422 through the manifold 424, such as defining a serpentine path through the manifold 424, between a manifold inlet 440 and a manifold outlet 442.

Figure 21:
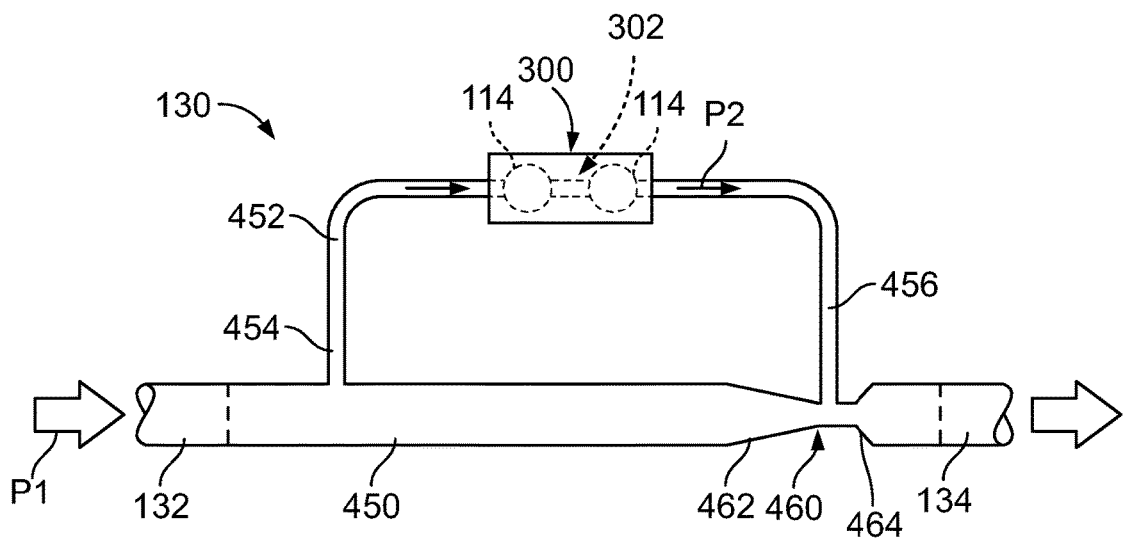
FIG. 21 is a schematic illustration of the cooling system in accordance with an exemplary embodiment.

FIG. 21 is a schematic illustration of the cooling system 130 in accordance with an exemplary embodiment. FIG. 21 illustrates a coolant channel 450 between the coolant supply line 132 and the coolant return line 134. The cooling system 130 includes a bypass channel 452 having a takeoff 454 and a return 456 to the coolant channel 450. The terminal heat exchanger 300 is in flow communication with the bypass channel 452. Coolant flowing through the bypass channel 452 flows through the flow channel 302 of the terminal heat exchanger 300.

In an exemplary embodiment, the cooling system 130 includes a venturi 460 in the coolant channel 450. In various embodiments, the cooling system 130 may use a high-volume, low-pressure (HVLP) coolant stream for cooling the terminals 114. The venturi 460 is provided to increase the pressure through the terminal heat exchanger 300. The venturi 460 includes a converging nozzle 462 to reduce the flow area at a vena contracta of the venturi 460 and a diverging nozzle 464 to increase the flow area downstream of the venturi 460. The differential pressure created by the venturi 460 improves flow through the terminal heat exchanger 300. The inlet of the terminal heat exchanger 300 is connected to the inlet of the venturi 460 (for example, the coolant supply line 132) at pressure P1. The outlet of the terminal heat exchanger 300 is connected to the vena contracta of the venturi 460 at the lowest-pressure point at pressure P2. The differential pressure (P1-P2) developed by the venturi 460 results in increased flow velocity through the terminal heat exchanger 300.

Figure 22:
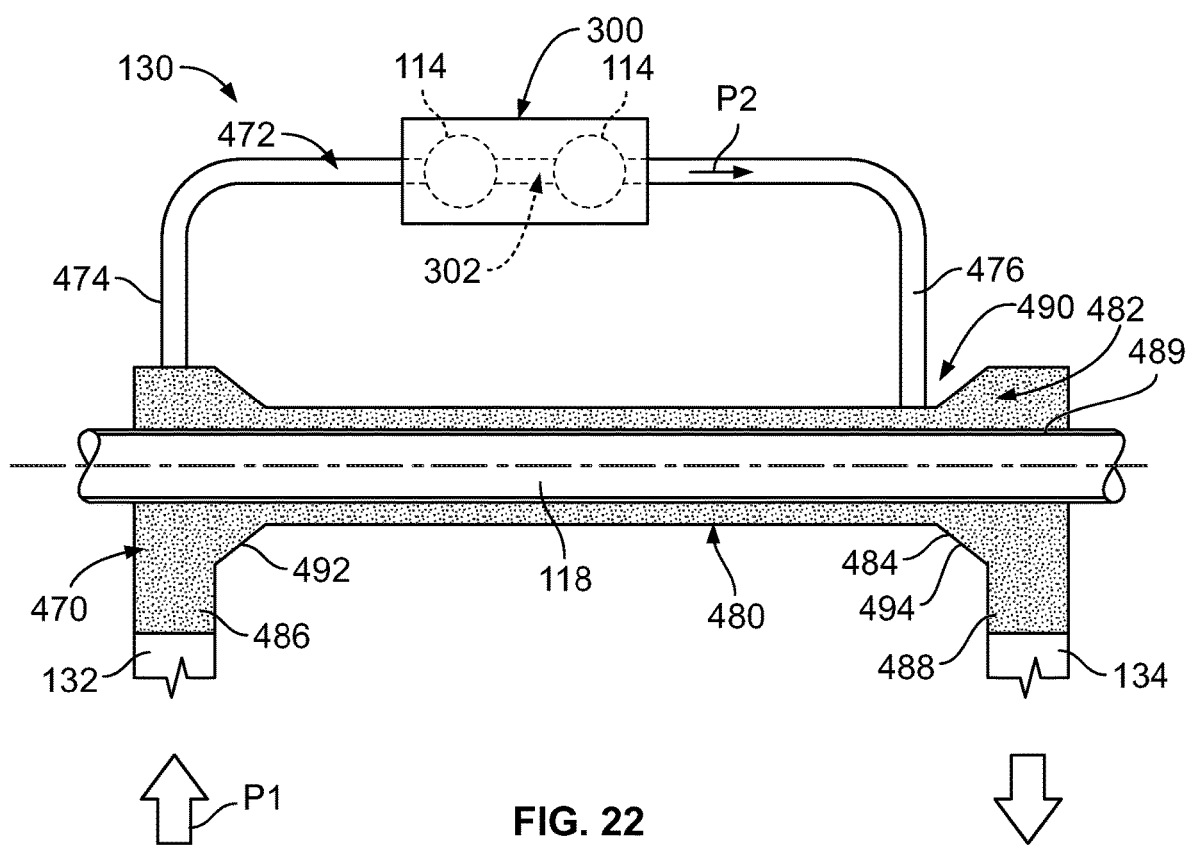
FIG. 22 is a schematic illustration of the cooling system in accordance with an exemplary embodiment.

FIG. 22 is a schematic illustration of the cooling system 130 in accordance with an exemplary embodiment. FIG. 22 illustrates a coolant channel 470 between the coolant supply line 132 and the coolant return line 134. In an exemplary embodiment, the coolant channel 470 supply coolant flow for cooling the terminals 114 and also supplies coolant for cooling the power cable 118. For example, the cooling system 130 includes a bypass channel 472 having a takeoff 474 and a return 476 to the coolant channel 470 for the terminal heat exchanger 300. The terminal heat exchanger 300 is in flow communication with the bypass channel 472. Coolant flowing through the bypass channel 472 flows through the flow channel 302 of the terminal heat exchanger 300. The cooling system 130 also includes a cable heat exchanger 480 for cooling the power cable 118 in an exemplary embodiment. The cable heat exchanger 480 is in direct thermal contact with the power cable 118. The cable heat exchanger 480 includes a flow channel 482 defined by a manifold 484 that receives the power cable 118. The manifold 484 may be separate from the manifold 304 or alternatively the manifolds 484, 304 may be integral as a single, unitary manifold. The flow channel 482 extends between an inlet 486 and an outlet 488. In an exemplary embodiment, a separator 489 is provided between the power cable 118 and the coolant in the flow channel 482. The separator 489 electrically isolates the power cable 118 from the coolant. The separator 489 is highly thermally conductive to provide efficient thermal transfer between the power cable 118 and the coolant.

In an exemplary embodiment, the cooling system 130 includes a venturi 490 in the coolant channel 470, such as in the manifold 484; however, the venturi 490 may be provided separately from the manifold 484. In various embodiments, the cooling system 130 may use a high-volume, low-pressure (HVLP) coolant stream for cooling the terminals 114 and the power cable 118. The venturi 490 is provided to increase the pressure through the terminal heat exchanger 300 and the cable heat exchanger 480. The venturi 490 includes a converging nozzle 492 to reduce the flow area at a vena contracta of the venturi 490 and a diverging nozzle 494 to increase the flow area downstream of the venturi 490. The differential pressure created by the venturi 490 improves flow through the terminal heat exchanger 300 and the cable heat exchanger 480. In an exemplary embodiment, the inlet of the terminal heat exchanger 300 is connected to the inlet of the venturi 490 (for example, the coolant supply line 132) at pressure P1. The outlet of the terminal heat exchanger 300 is connected to the vena contracta of the venturi 490 at the lowest-pressure point at pressure P2. The differential pressure (P1-P2) developed by the venturi 490 results in increased flow velocity through the terminal heat exchanger 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:
   a housing extending between a front and a rear, the housing having a chamber at the rear, the housing having at least one terminal channel between the front and the rear;
   a first terminal coupled to the housing, the first terminal including a mating pin at a front of the first terminal and a cable connector at a rear of the first terminal, the mating pin positioned in the at least one terminal channel for mating with a charging connector, the cable connector positioned in the chamber at the rear of the housing;
   a second terminal coupled to the housing, the second terminal including a mating pin at a front of the second terminal and a cable connector at a rear of the second terminal, the mating pin positioned in the at least one terminal channel for mating with the charging connector, the cable connector positioned in the chamber at the rear of the housing; and
   a terminal heat exchanger positioned in the chamber, the terminal heat exchanger being thermally coupled to the cable connector of the first terminal and being thermally coupled to the cable connector of the second terminal, the terminal heat exchanger having at least one separator electrically isolating the terminal heat exchanger from the first terminal and the second terminal.

2. The electrical connector of claim 1, wherein the terminal heat exchanger includes a flow channel for coolant flow through the terminal heat exchanger for actively cooling the first and second terminals.

3. The electrical connector of claim 1, wherein the terminal heat exchanger includes a manifold having a flow channel providing coolant flow between an inlet of the manifold and an outlet of the manifold, the separator being positioned between the coolant in the flow channel and the cable connector of the terminal first and second terminals.

4. The electrical connector of claim 1, further comprising a rear cover coupled to the rear of the housing, the rear cover including a coolant inlet and a coolant outlet, the coolant inlet in flow communication with the terminal heat exchanger, the coolant outlet in flow communication with the terminal heat exchanger.

5. The electrical connector of claim 1, further comprising a power cable coupled to the cable connector, the electrical connector further comprising a cable heat exchanger positioned in the chamber, the cable heat exchanger being thermally coupled to the power cable.

6. The electrical connector of claim 1, wherein the terminal heat exchanger includes a first flow channel for coolant flow through the terminal heat exchanger for actively cooling the terminal, the electrical connector further comprising a cable heat exchanger positioned in the chamber, the cable heat exchanger being thermally coupled to a power cable terminated to the cable connector, the cable heat exchanger includes a second flow channel for coolant flow through the cable heat exchanger for actively cooling the power cable.

7. The electrical connector of claim 1, wherein the terminal heat exchanger includes a heat transfer element coupled to the terminal in thermal communication with the cable connector of the terminal.

8. The electrical connector of claim 7, wherein the heat transfer element comprises a clip coupled to the cable connector, the clip being compressed against the separator.

9. The electrical connector of claim 7, wherein the heat transfer element includes an inner surface facing the cable connector and an outer surface opposite the inner surface, the separator being positioned between the inner surface and the cable connector, the terminal heat exchanger including a flow channel for coolant flow through the terminal heat exchanger for actively cooling the outer surface of the heat transfer element.

10. The electrical connector of claim 7, wherein the cable connector of the terminal includes a weld tab, the heat transfer element includes a thermal gasket coupled to the weld tab, the separator being coupled to the thermal gasket.

11. The electrical connector of claim 10, wherein the terminal heat exchanger further comprises a manifold having a flow channel for coolant flow through the manifold, the flow channel providing the coolant in thermal communication with the heat transfer element, the separator being positioned between the coolant in the flow channel and the thermal gasket.

12. The electrical connector of claim 1, wherein the separator is a ring having an opening receiving the cable connector of the terminal.

13. The electrical connector of claim 12, wherein the ring is split at a seam, the ring being compressible against the cable connector.

14. The electrical connector of claim 12, wherein the ring includes radial fins separated by fin channels, the terminal heat exchanger including a flow channel for coolant flow through the terminal heat exchanger, the flow channel being in flow communication with the fin channels to allow coolant flow through the ring.

15. The electrical connector of claim 1, further comprising a cooling assembly including a coolant channel between a coolant supply and a coolant return in flow communication with the terminal heat exchanger, the cooling assembly including a venturi for controlling coolant flow pressure and controlling coolant flow velocity through the cooling assembly and the terminal heat exchanger.

16. The electrical connector of claim 15, further comprising a cable heat exchanger positioned in the chamber, the cable heat exchanger being thermally coupled to a power cable terminated to the cable connector, the cable heat exchanger includes a flow channel in flow communication with the venturi.

17. An electrical connector comprising:
a housing extending between a front and a rear, the housing having a chamber at the rear, the housing having a terminal channel between the front and the rear;
a terminal coupled to the housing, the terminal including a mating pin at a front of the terminal and a cable connector at a rear of the terminal, the mating pin positioned in the terminal channel for mating with a charging connector, the cable connector positioned in the chamber at the rear of the housing; and
a terminal heat exchanger positioned in the chamber, the terminal heat exchanger including a heat transfer element thermally coupled to the cable connector of the terminal, the terminal heat exchanger including a separator electrically isolating the heat transfer exchanger from the terminal, the terminal heat exchanger including a manifold having a flow channel for coolant flow through the manifold between an inlet of the manifold and an outlet of the manifold, the flow channel providing the coolant in thermal communication with the heat transfer element, the separator being positioned between the coolant in the flow channel and the cable connector of the terminal.

18. The electrical connector of claim 17, further comprising a cable heat exchanger positioned in the chamber, the cable heat exchanger being thermally coupled to a power cable terminated to the cable connector, the cable heat exchanger includes a second flow channel for coolant flow through the cable heat exchanger for actively cooling the power cable, the flow channel being in flow communication with the second flow channel.

19. The electrical connector of claim 17, wherein the terminal heat exchanger includes a heat transfer element coupled to the terminal in thermal communication with the cable connector of the terminal, the heat transfer element comprises a clip coupled to the cable connector, the clip being compressed against the separator.

20. The electrical connector of claim 17, wherein the terminal heat exchanger includes a heat transfer element coupled to the terminal in thermal communication with the cable connector of the terminal, the heat transfer element includes an inner surface facing the cable connector and an outer surface opposite the inner surface, the separator being positioned between the inner surface and the cable connector, the terminal heat exchanger including a flow channel for coolant flow through the terminal heat exchanger for actively cooling the outer surface of the heat transfer element.

21. The electrical connector of claim 17, further comprising a cooling assembly including a coolant channel between a coolant supply and a coolant return in flow communication with the terminal heat exchanger, the cooling assembly including a venturi for controlling coolant flow pressure and controlling coolant flow velocity through the cooling assembly and the terminal heat exchanger.

22. An electrical connector comprising:
a housing extending between a front and a rear, the housing having a chamber at the rear, the housing having a terminal channel between the front and the rear;
a terminal coupled to the housing, the terminal including a mating pin at a front of the terminal and a cable connector at a rear of the terminal, the mating pin positioned in the terminal channel for mating with a charging connector, the cable connector positioned in the chamber at the rear of the housing, the cable connector including a weld tab having a surface configured to be welded to a power cable; and
a terminal heat exchanger positioned in the chamber, the terminal heat exchanger being thermally coupled to the weld tab of the cable connector, the terminal heat exchanger including a manifold having a flow channel for coolant flow through the manifold, the terminal heat exchanger having a separator between the weld tab and the flow channel for electrically isolating the weld tab from the coolant in the flow channel.

* * * * *